US 7,328,201 B2

(12) United States Patent
D'Ambrosio

(10) Patent No.: US 7,328,201 B2
(45) Date of Patent: Feb. 5, 2008

(54) SYSTEM AND METHOD OF USING SYNTHETIC VARIABLES TO GENERATE RELATIONAL BAYESIAN NETWORK MODELS OF INTERNET USER BEHAVIORS

(75) Inventor: Bruce Douglass D'Ambrosio, Corvallis, OR (US)

(73) Assignee: Cleverset, Inc., Corvalis, OR (US)

(*) Notice: Subject to any disclaimer, the term of this patent is extended or adjusted under 35 U.S.C. 154(b) by 216 days.

(21) Appl. No.: 10/888,353

(22) Filed: Jul. 9, 2004

(65) Prior Publication Data

US 2005/0033712 A1 Feb. 10, 2005

Related U.S. Application Data

(60) Provisional application No. 60/571,187, filed on May 14, 2004, provisional application No. 60/488,239, filed on Jul. 18, 2003.

(51) Int. Cl.
*G06N 5/00* (2006.01)
(52) U.S. Cl. .......................................... 706/52; 706/45
(58) Field of Classification Search .................. 706/50, 706/52, 45, 47; 726/23; 705/400, 14, 2, 705/10; 382/116
See application file for complete search history.

(56) References Cited

U.S. PATENT DOCUMENTS

| | | | | |
|---|---|---|---|---|
| 6,115,718 | A  * | 9/2000 | Huberman et al. | 707/102 |
| 6,430,305 | B1 * | 8/2002 | Decker | 382/116 |
| 6,553,352 | B2 * | 4/2003 | Delurgio et al. | 705/400 |
| 6,779,119 | B1 * | 8/2004 | Moshfeghi et al. | 726/23 |
| 6,801,909 | B2 * | 10/2004 | Delgado et al. | 707/4 |
| 6,836,773 | B2 * | 12/2004 | Tamayo et al. | 707/6 |
| 6,895,398 | B2 * | 5/2005 | Evans-Beauchamp et al. | 706/50 |
| 2002/0062245 | A1 * | 5/2002 | Niu et al. | 705/14 |

OTHER PUBLICATIONS

D'Ambrosio, Bruce; Altendorf, Eric; and Jorgensen, Jane; Probabilistic Relational Models of On-Line User Behavior, The Ninth ACM SIGKDD International Conference on Knowledge Discovery and Data Mining, Aug. 24-27, 2003, Washington, DC, USA, pp. 1-8.*

* cited by examiner

*Primary Examiner*—Wilbert L Starks, Jr.
(74) *Attorney, Agent, or Firm*—Perkins Coie LLP

(57) ABSTRACT

The present invention provides a language, method and system to formulate and evaluate relational Bayesian networks in an e-commerce environment. The present invention employs a specific language for constructing synthetic variables used to predict events in the Bayesian networks. The present system and language allow for efficient and accurate representation, inference, and discovery of the synthetic variables used to model web visitor behavior.

35 Claims, 16 Drawing Sheets

SYSTEM AND METHOD OF USING SYNTHETIC VARIABLES TO GENERATE RELATIONAL BAYESIAN NETWORK MODELS OF INTERNET USER BEHAVIORS

CROSS-REFERENCE TO RELATED APPLICATION

The present application claims the benefit of pending U.S. Provisional Application No. 60/488,239, filed Jul. 18, 2003 and U.S. Provisional Application No. 60/571,187, filed May 14, 2004, both of which are incorporated herein in their entirety by reference.

TECHNICAL FIELD

The present invention is directed to a language, method and system for creating a relational Bayesian network to model a user's web-behavior in an e-commerce environment.

BACKGROUND

Today's e-commerce applications do not provide the service expected by customers or the performance demanded by e-merchants. In brick-and-mortar establishments, attentive sales staff members assume the role of assistant and guide, enabling business transactions that optimize customer satisfaction and transaction value. In person-to-person interactions, merchants are able to respond quickly and flexibly to customer concerns and to provide information to the customer as appropriate. Simultaneously, the face-to-face interactions provide opportunities to sell customers the products that satisfy their requirements and maximize profit for the merchant. Current e-commerce implementations are neither dynamic nor responsive in the time frames necessary to assess a customer's needs and provide the products and terms that will close the sale.

In e-commerce, visitors to e-commerce web sites are always potential customers. The analysis of web visitor behavior is currently accomplished through the use of web site analytics and integrative systems that allow consolidation and access to large volumes of historical data. While these tools provide useful retrospective insights on customers and products, they cannot model web visitor behavior accurately in real-time. Therefore, the responsive relationship between a salesperson and a customer in a brick-and-mortar store, with all its demonstration, information and upsell opportunities, simply does not exist in e-commerce. Standard statistical approaches are a poor fit with online behavioral data. Effective real-time web visitor behavior modeling requires making increasingly customer-centric, accurate inferences, often with extremely sparse data, associated with individual web visitors over very short time periods.

True customer-centric interaction can only take place when the web site responds to each web visitor in an appropriate and personalized manner. Previous attempts at understanding customer intent and needs in real-time have failed, largely because the simple modeling paradigms employed were incapable of integrating the rich detail available about a web visit. For example, it is standard in web-visitor behavior modeling to pre-classify web pages into a handful of distinct types, and try to identify path profiles from transitions over page types. In fact, there are several classes of information that can be exploited in understanding customer behavior. These classes are Visitor demographics, if the visitor is known to the site (e.g., zip code, time since last visit); Session-level visitor information (e.g., time of day, etc); Page location information (e.g., with web-site overall structure); Page presentation information (e.g., ad content, side-bar information presented, etc); Content information (e.g., attributes of specific products presented in detail, if any); and Click-stream dynamics, including both inter and intra-click dynamic information (e.g., inter-click elapsed time, mouse-overs).

Integration of all this information into a comprehensive model of the real-time behavior of a web site visitor is difficult or impossible without a modeling approach that can account for the complex relationships among these various types of data. This is especially true when some of the parameters may be unobservable (e.g., visitor intent). Relational Bayesian modeling combines a relational data model with the probabilistic semantics needed to effectively model the stochastic elements of observable behavior. One challenge in understanding dependencies among relational data is one-to-many relationships among data elements.

A prior art paper by Getoor et al [Getoor et al, 1999] have suggested the use of aggregation operators (cardinality, max, min, mean, sum, etc. . . . ) to model dependence from many to one. For example, at the relational level one might model that session purpose is closely correlated with the number of page requests in a session (i.e., cardinality). Little work has been done on identifying a broadly applicable set of such operators, nor has the adequacy of this approach been evaluated. A complementary alternative is the notion of selection, as used in Inductive Logic Programming. For example, one might surmise that what is most informative isn't simply the number of page requests in a session, but rather the number of page requests where PageRequest.page.type=catalog_page. Others have suggested combining rules [Laskey, 2001], and default mechanisms for combining information from multiple, similar, sources.

As an example, consider the following simple dynamic model of web-site visitors. FIG. 1 is the schema for a simple relational database of web server page requests. FIG. 2 is a simple relational Bayesian model over this database.

FIG. 3 shows the instance-level map for a visitor with only one session, consisting of two page requests. Note that the part of the schema-level model for page-requests has been replicated for each actual page request.

Another model contains the subgraph consisting of Session.purpose and the two PageRequest.page.type nodes, as shown in FIG. 4. Suppose that, at the schema level, the arc from Session.purpose to PageRequest.page.type had been reversed. Then, at the instance level, this would form the subgraph shown in FIG. 4. The semantics of Bayesian networks require that, for such a subgraph, P(Session.purpose|PageRequest1.page.type, PageRequest2.page.type) must be known. The relational model provides, however, a generic P(Session.purpose|PageRequest.page.type). These prior art techniques do not contain a practical way to extend this distribution to handle multiple conditioning variables. Therefore presently there is no effective way to model and predict user behavior in an e-commerce environment using prior art techniques.

DETAILED DESCRIPTION

The present invention provides a language, method and system to formulate and evaluate relational Bayesian networks in an e-commerce environment. The present invention employs a specific language for constructing synthetic variables used to predict events in the Bayesian networks. The present system, methods and language allow for efficient and accurate representation, inference, and discovery of the variables used to model web visitor behavior.

Figures 1, 2:
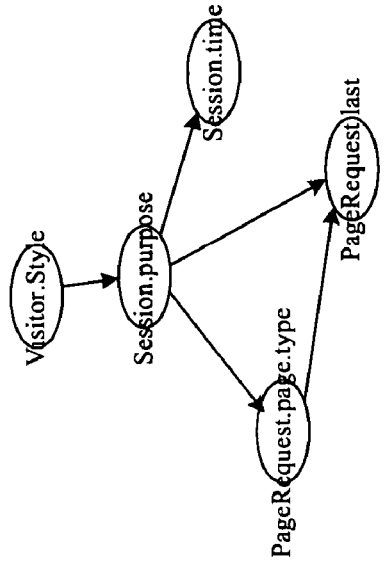
FIG. 1 illustrates a Prior Art relational database.
FIG. 2 illustrates a Prior Art relational Bayesian network.
Figure 3:
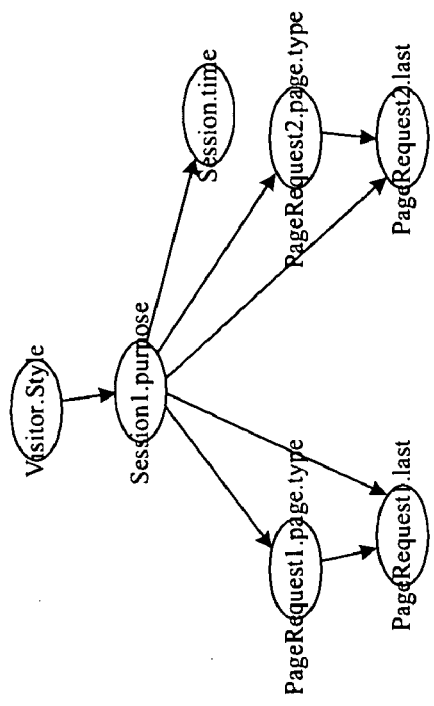
FIG. 3 illustrates a Prior Art relational Bayesian network.
Figure 4:
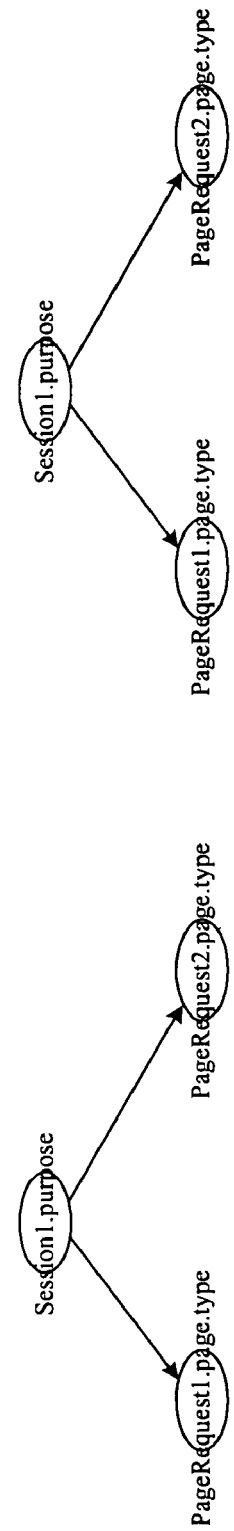
FIG. 4 illustrates a Prior Art relational Bayesian network.
Figure 5:
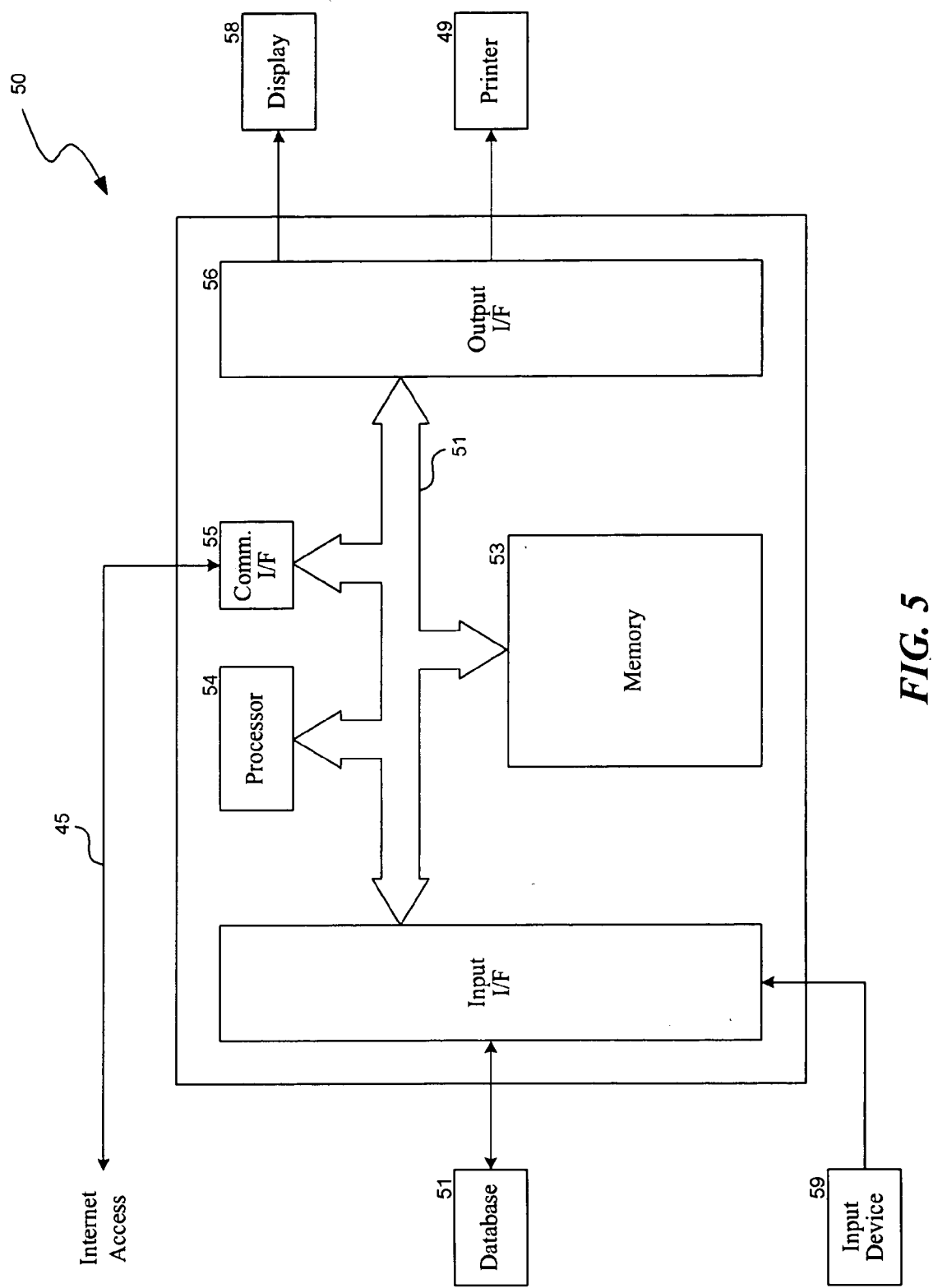
FIG. 5 illustrates a block diagram of the system of the present invention.

FIG. 5 depicts a high-level block diagram of a computer system 50 that implements the present invention. As shown, computer system 50 comprises input interfaces 52, processor 54, communications interface 55, memory 53 and output interfaces 56, all connected by bus 57. Memory 53 stores the operating system programs and the application programs of the present invention.

The inputs to the system 50 include an internet access line 45, a user input device 59 and a connection to a database 51. These inputs are connected through the appropriate interfaces and together provide the necessary data to model a user's web-behavior. The incoming data incorporated with the application programs of the present invention and the processor 54 will model and evaluate relational Bayesian networks as described in detail with reference to FIGS. 6-13.

As shown in FIG. 5, incoming information used to create the Bayesian networks can arise from two types of external sources, real-time network supplied information, e.g. from the Internet and/or other networked facility, through network connection 45 to communications interface 55, or from a dedicated input source such as a database 51 through input interface 52. A display 58, such as a conventional color monitor is connected to output interfaces 56 along with printer 49. The display 58 is used by an operator to aid in the interactive process of creating Bayesian networks as described below.

Figure 6:
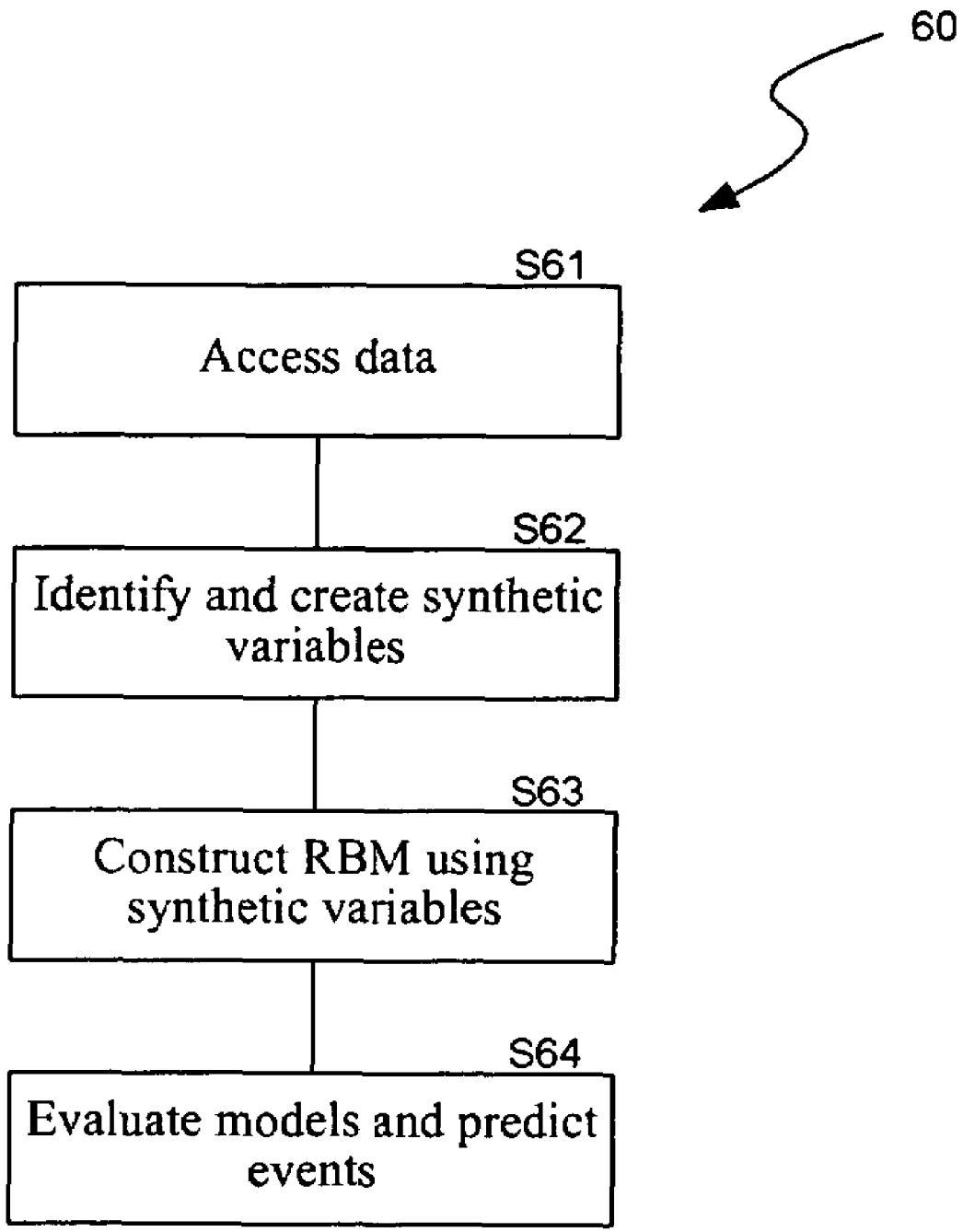
FIG. 6 is a flow diagram illustrating a process of one embodiment of the present invention.

FIG. 6 shows a high-level flow diagram of a process 60 of the present invention. The programs stored in the memory 53 as shown in FIG. 5 would enact this process. In step S61 data is accessed by the system as shown in FIG. 5. This may encompass reading data from a database or receiving real-time web-user clicking behavior. In step S62, using the language provided by the present invention, a number of synthetic variables are identified and created. Once these variables are created, in step S63 relational Bayesian models may be constructed to predict events. In step S64 the Bayesian models are evaluated and web-behavior events are predicted.

Figure 7:
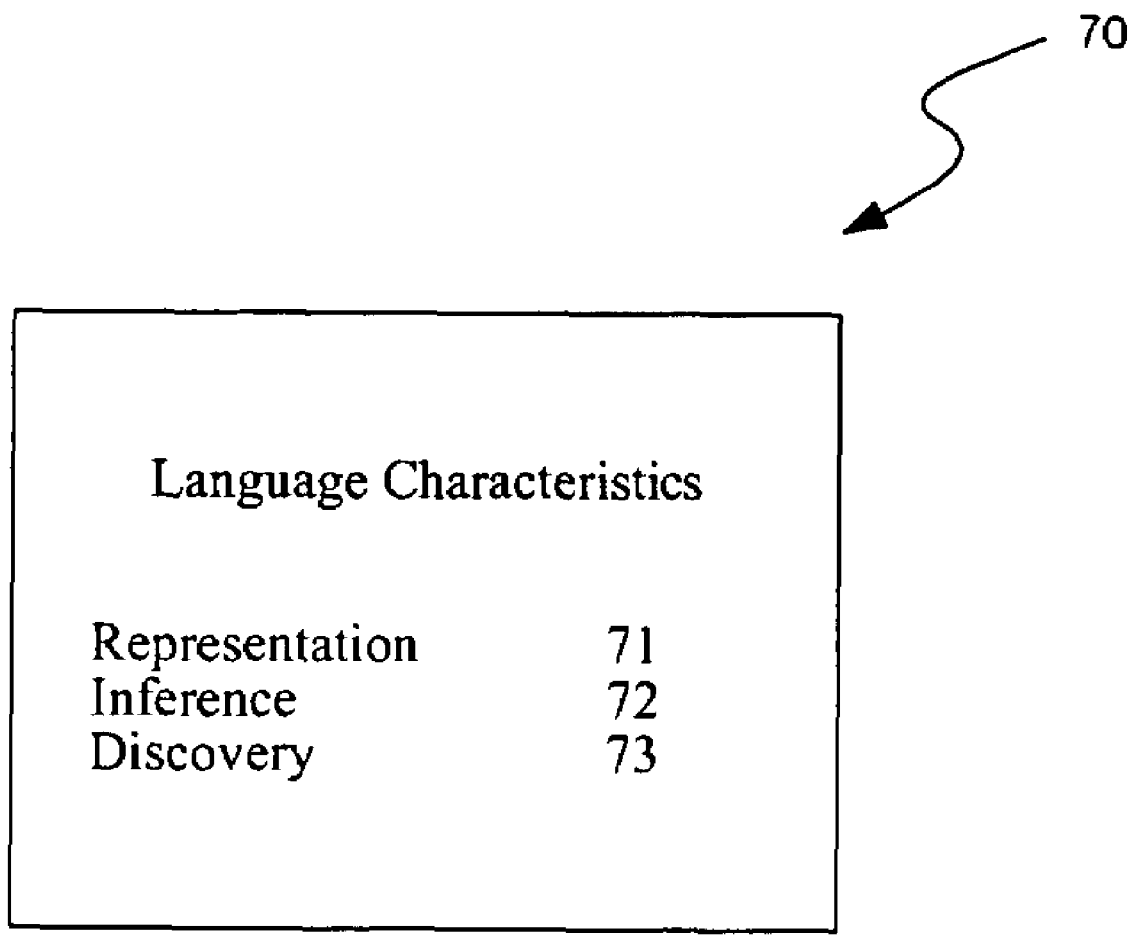
FIG. 7 illustrates the language characteristics of the present invention.

In order to accomplish the creation and evaluation of Bayesian networks as described, the present invention provides a new language that better represents the synthetic variables involved and identifies a set of useful, efficient selection phrases. The language provided by the present invention further develops a compact selection phrase grammar that covers as large a subset of useful selection phrases and provides a set of useful, efficient, commonly occurring aggregation operators. Referring to FIG. 7, the language characteristics 70 of the present invention are defined by three characteristics, Representation 71, Inference 72 and Discovery 73. Each of the characteristics 71-73 will be described in more detail below.

Figure 8:
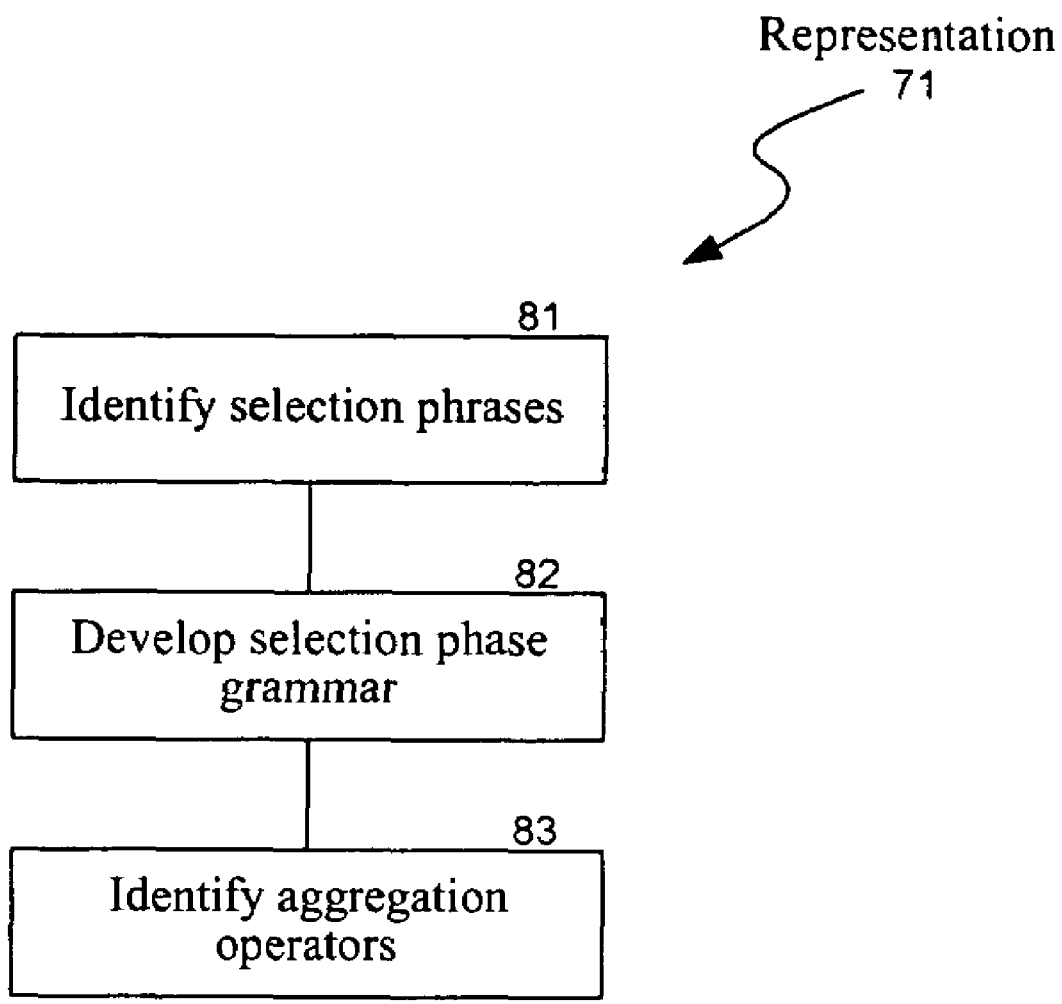
FIG. 8 illustrates the representation characteristics of the present invention.

Regarding the language Representation 71, FIG. 8 shows features necessary to provide a path expression languages capable of traversing fields and expressing synthetic variables. Element 81 refers to an Identification of a set of useful, efficient, selection phrases. For example, using the specific language representation, the present invention can create a set of synthetic variables used to model web-behavior. The set consists of the following 4 variables: "The elapsed time between the current click and the previous click", "The average elapsed time between clicks in a session", "The number of clicks in a session" and "The number of clicks in a session preceding the current click". None of these variables are expressible as simple path expressions by prior art methods.

Referring to the Synthetic Variable Grammar 82, a synthetic variable is made up of a chain of elements (an expression), each of which acts as a mapping from input data to output data. Every synthetic variable starts with the name of a table in the schema. For an informal flavor for the types of synthetic variables the present invention might construct, what they look like and their interpretation, consider the following list of examples:

Session.clicks.Count( ) (for a given session, return the number of clicks that were in that session)

Session.clicks.urt.Mode( ) (for a session, return the most frequently requested URL)

Click.session.clicks.pagetype.Uniquify( ).Count( ) (for a click, find the number of distinct page types visited in that session)

Click.session.clicks.Diff (time, .prev.time).Mean( ) (for a click, find its session and calculate the average time between clicks in that session)

Click.Diff(.session.clicks[.GT(.time,  $src.time)][.Equals (.pgtype, "Checkout")].idx.MIN( ), $src.idx) (for a click, return the number of subsequent clicks in the session before the first request for a Checkout page—i.e., number of clicks until a purchase event)

The primary elements of the grammar 82 are fields, selectors, and functions. Fields are column names from the input (left) table. Selectors filter data based on the value returned by evaluating a Boolean subexpression on the data. Functions generalize the notion of aggregators, allowing arbitrary data manipulation. Functions whose behavior requires operating on tuples of data take subexpressions as arguments. A BNF syntax is shown below, where classelem ranges over the set of names of tables in a schema, and field ranges over the set of names of columns in the schema.

| | |
|---|---|
| synthvar | classelem{elem}+ |
| expr | rootelem{elem}+ |
| rootelem | classelem \| variable \| constant |
| elem | field \| selector \| .function \| variable \| constant |
| selector | [expr] |
| function | funcname( expr?{, expr}* ) |
| variable | $varname |
| constant | '[0–9]+{.[0–9]}+' \| "[a–z,0–9]+" |

Referring to the Identification of aggregation operators 83, there are two common types of functions provided by the language of the present invention. Functions which take two subexpressions as arguments, such as Equals( ), are operators. One argument functions which guarantee a many-to-one cardinality mapping, such as Count( ), are aggregators. following standard database terminology. For convenience we permit postfix format for 1-argument functions. We have also defined other functions, such as Uniquify( ) (a bag-to-set reducer), as needed for our modeling applications. Our implementation includes both a set of built-in functions and facilities for dynamically defining additional operators as needed. The built-in operators include:
The one-function functions: Uniquify, Log, Sqrt.
The two-argument functions: Equals, GreaterThan, Sum, Diff, Divide.
The aggregators: Count, Max, Mean, Min, Mode, Variance.
It is also noted that a subexpression, which does not begin with a variable, must begin with a class element matching the class output by the previous element in the outer level expression. Since class elements in subexpressions can be inferred by the user, they are not displayed and these subexpressions instead begin with a "." character followed by the second element in the subexpression.

To facilitate type-checking, each element (elem) of a synthetic variable defines an input/output type mapping. This mapping will depend on the relational schema being analyzed, but not on the actual data populating the schema. This means that expressions can be statically type checked given a relational schema.

Datatypes are either reference (subdivided into one type per class or table in the relational schema) or primitive (string, numeric, and Boolean). In addition, typing information includes the cardinality of the data. For example, aggregators guarantee singleton output, multi-valued fields warn of possibly multi-valued output (singleton sets are automatically de-referenced where appropriate), and singleton fields guarantee output cardinality equal to the cardinality of the incoming data.

For an expression to be correctly typed, the present invention requires that at each step of evaluation, the current element is defined on the type of the incoming data. For example, numeric aggregators like Mean( ) or Sum( ) require multi-valued numeric input, and a field element requires input of the table on which that field is defined. In addition, aggregators require (possibly) multi-valued inputs, and single-input functions require singleton incoming data. Finally, expressions must produce singleton data in order to be evaluated, guaranteeing that synthetic variables can be evaluated to a single value, and that selectors and operators may evaluate their subexpressions to a single value.

An example of the Representation 71 of the 4 variables set forth above using the language of the present invention is shown below:

The elapsed time between the current click and the previous click: Click.Diff(.time, $src.session. clicks[.GT($src.time, time)].time.Max( )

The number of clicks in a session: Session.clicks. Count( )

The number of clicks in a session preceding the current click: Click.session.clicks[.GT($src.time, . time)].Count( )

The average elapsed time between clicks in a session. Session.Div(.Diff(.clicks.time.Max( ), clicks.time.Min( )), clicks.Count( ))

Figure 9:
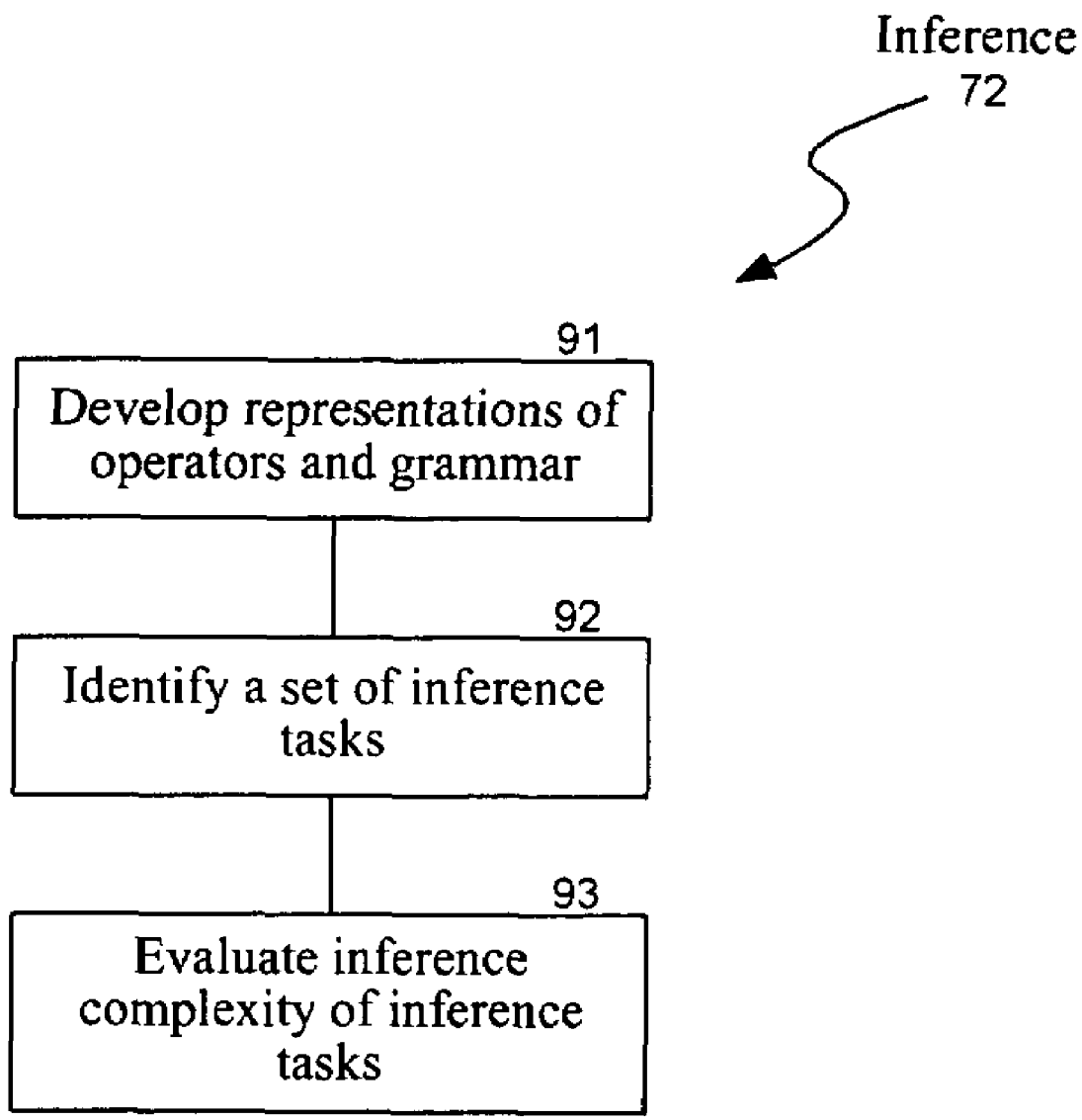
FIG. 9 illustrates the processing steps of the inference method of the present invention.

Referring to FIG. 9, the Inference (72) characteristic of the synthetic variable language is efficiently evaluated during both model discovery and model application, and supports efficient inference within the discovered networks. The elements of inference 72 include: 91 Development of candidate representations for each aggregation operator and each selection grammar phrase identified in the representation phase, 92 Identification of a set of inference tasks under which to evaluate inference complexity of the above representations and 93 Evaluation of the inference complexity of each candidate representation under the inference tasks.

Included in these three steps would be: (91) evaluation of synthetic variables on data during model discovery, (92) Bayesian network representation and inference with synthetic variables for use during parameter estimation and structure discovery, and (93) evaluation of synthetic variables during model application, especially on-line in an e-commerce setting. The present invention provides a solution to the problem of inference with synthetic variables, specifically that of synthetic variable evaluation in support of parameter estimation and structure discovery. The present invention further develops caching methods for efficient evaluation, both at the language level (e.g., through the introduction of functions) and at the implementation level.

In order to evaluate a synthetic variable as defined in the grammar above, an expression is defined as a rootable element followed by a chain of other elements (some of which may be selectors or functions with nested subexpressions). It is evaluated on an instance of the class associated with the root element. For example, Session.clicks.Count( ) is a synthetic variable which may be evaluated on instances from the Session table, and Session.clicks[.Equals(.pagetype,.prev.pagetype)].Count( ) contains three subexpressions, .Equals(.pagetype,.prev.pagetype), .pagetype, and .prev.pagetype, each of which may be evaluated on an instance from the Click table.

One difference between the present invention and prior methods in the use of synthetic variables and the traditional use of path expressions in object-oriented database query languages is that the present invention always evaluate an expression relative to a single instance of the class on which it is defined. Therefore, the present invention avoids the general translation of path expressions to standard database queries, and instead adopts a simplified left-to-right evaluation of queries, following a Unix pipe metaphor of cascading data, filters, and manipulators.

Evaluation proceeds left to right in a data-streaming manner, each element accepting (possibly multiple) data from the previous element and producing (possibly multiple) data for the subsequent element. The value of the expression is the output of the last element in the chain.

Each element in an expression defines start( ), acceptDatum( ), and finish( ) methods which perform the necessary computation and recursively call the appropriate methods on the following element. This allows each element type to optimize performance depending on its data needs (for example, the acceptDatum( ) method on the Count( ) aggregator merely increments a counter), and permits user-defined functions.

Figure 10:
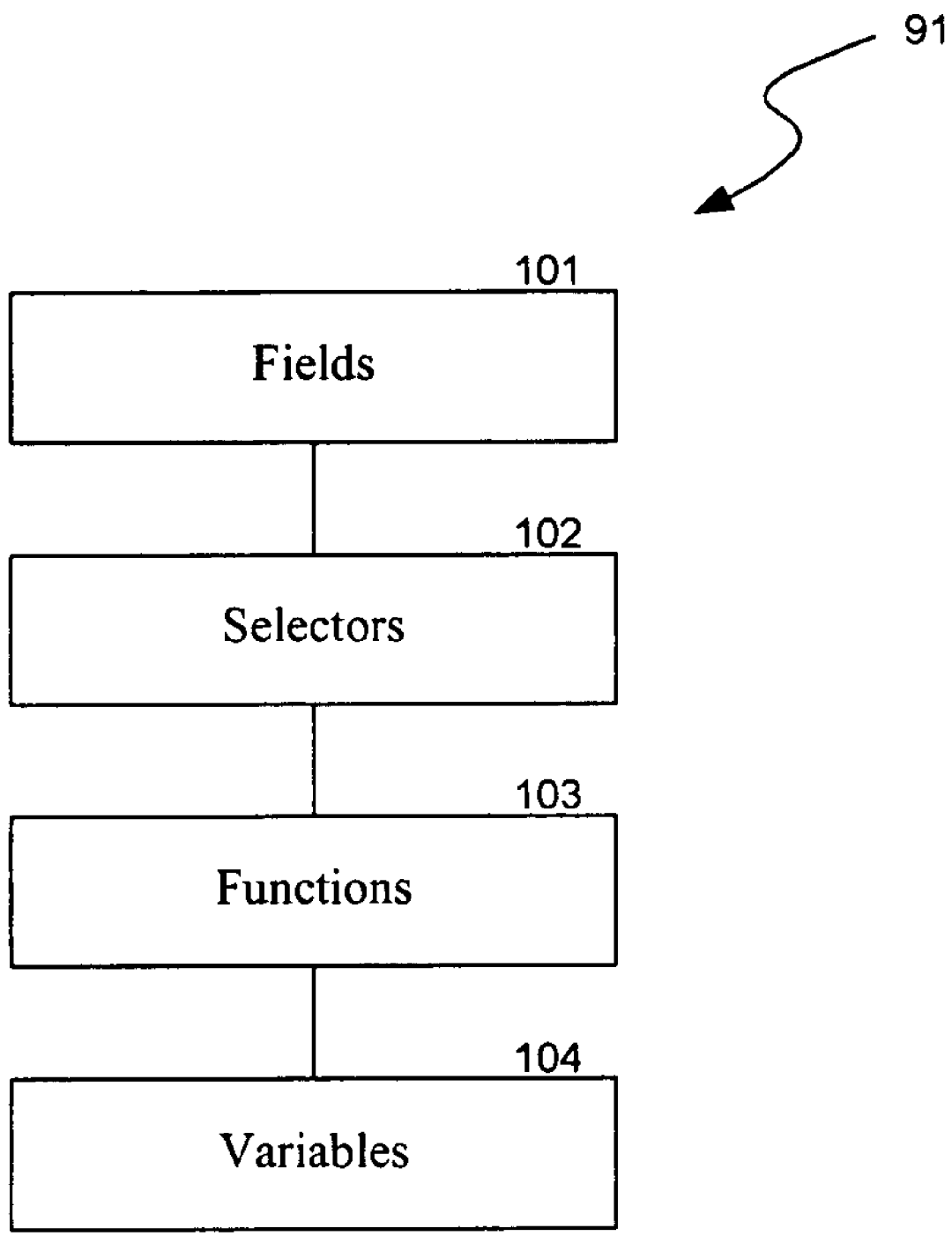
FIG. 10 illustrates the inference characteristics of the present invention.

Referring to FIG. 10, shown are the characteristics of each element type:

fields 101, selectors 102, functions 103 and variables 104. The evaluation of a field element 101 generates data containing the reference or primitive value(s) contained in the appropriate field on the incoming data. If the incoming data is single-valued and the field is single-valued, the produced data will be single-valued. Otherwise, the produced data will be multi-valued. In the case that the incoming data is multi-valued and the field is multi-valued, the result will be a flattened set (the bag union of all field values on all instances from the incoming data); that is, we do not support nested collections.

The evaluation of a selector 102 returns a subset of the incoming data. Specifically, it will return a collection containing each datum in the incoming data for which the provided Boolean subexpression evaluates to true.

The evaluation of a function 103 returns a value based on the arguments to the function. For example, two-argument Boolean operators such as Equals( ) or GT( ) take the incoming datum, evaluate each subexpression on that datum, and return a Boolean value based on a comparison of those results.

In general, functions that operate on multi-valued data (for example, aggregators) are written in postfix notation, while functions, which operate on collections of n-tuples, take n subexpressions as arguments. While it would be possible for the latter type to take $n-1$ arguments, with the nth being the original input, (imagine a variable of the form Click.timestamp.Diff(.prev.timestamp)), this results in decreased expressive power, since we lose the ability to create new variable bindings, as discussed the following section.

The evaluation of a variable 104 returns the dataset bound to that variable. In implementation of the present invention there is only one variable, called $src, which is bound implicitly to the original root instance (a singleton) upon which the synthetic variable is being evaluated.

Referring to synthetic variable evaluation during model discovery (92), during model discovery, each synthetic variable is evaluated repeatedly over large datasets, within both parameter estimation and structure discovery. Caching, at multiple levels, seems essential to efficient support of model discovery over synthetic variables. While the present invention may cache synthetic variable values on a per-instance basis, essentially extending the original dataset, some other opportunities for caching are also provided. For example, consider the variable:

Session.clicks[.GT($src.clicks[.Equals(.page_type, "Marketing")].count.Min( ), .count)].page type.Uniquify( ).Count( )

This variable is the count of the number of different page types requested in clicks prior to the first "Marketing" click. The subexpression $src.clicks[.Equals(.page_type,"Marketing")].count.Min( ) (the count within session of the first marketing click) will be re-evaluated for every click in the session. There is a straightforward indicator of the caching opportunity here: the subexpression starts with the variable $src, references no other variables, and the surrounding context is multi-valued (because Session.clicks is multi-valued). In other cases caching opportunities exist because a subexpression occurs in multiple synthetic variables.

Referring to Bayesian network representation of synthetic variables (93), the semantics of RBNs are defined in terms of the underlying Bayesian network induced over the extensional data associated with a schema. The presence of an aggregation operator, however, means that a single variable at the RBN level may map into multiple instance variables. If the instance variables are all observed at application time, then the synthetic variable can simply be added as an observed node with no parents in the instance-level network. If, however, the instance variables are unobserved at application time, two problems arise: (1) if the RBN variable is a parent, we need a mapping, in Bayesian network form, of the aggregation function; (2) if the RBN variable is a child, then we need an invertible aggregation function (presumably as some form of constraint over the joint assignment space of the instance variables to which the aggregate maps. Requirement one is satisfied for base-level aggregators such as Max and Min by well-known existing mappings, such as the generalized Noisy-or [Pearl, 1988] and stochastic mean [Getoor, 2001]. Given a solution to requirement one, requirement two is trivially met by adding a constraint node (an observed child node with two parents: the node representing the output of the aggregation function, and the instance node(s) that are parents of the synthetic variable at the RBN level).

Selectors simply identify the relevant instance variables. Non-aggregation functions, such as Equals or GT (greater-than), introduce deterministic relationships among small subsets of nodes and are straightforward to represent. Synthetic variable evaluation in model application The issues surrounding synthetic variable evaluation in model application are somewhat different from those in model discovery. At application time we are interested in efficiently evaluating a synthetic variable wrt a single instance (e.g., the current web session).

Figure 11:
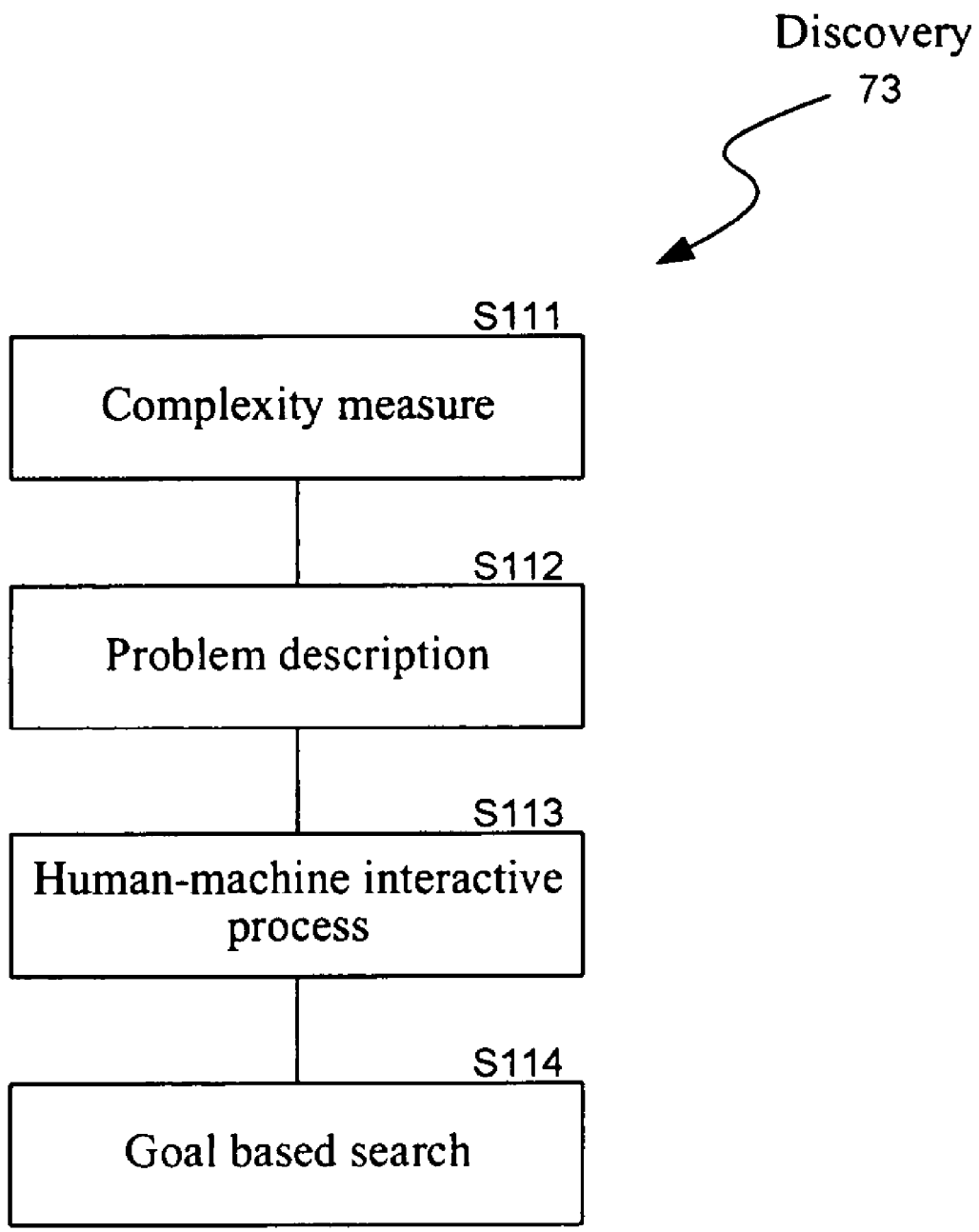
FIG. 11 illustrates the discovery characteristics of the present invention.

FIG. 11 shows four separate processes (Steps S111-S114) within the Discovery process 73. The present methods automatically identify relevant synthetic variables during model discovery. The present invention also provides methods that start from an efficient ordered enumeration of the space of synthetic variables, and then apply one or more filters to eliminate the less useful ones. One advantage to formally defining the syntax and semantics of the synthetic variable language is that it allows to automatically enumerate synthetic variables.

Steps S111-S114 enable exploration of candidate search methods for mixed-initiative and automated discovery of synthetic variables during model discovery. Evaluation of these methods demonstrate an efficient and semi-automatic identification of the features manually created by previous modeling efforts.

Regarding the Complexity Measure step S11, prior art path expressions are naturally ranked in complexity by their path length, the number of field traversals they include. The present invention provides however a more complex grammar. Specifically, the invention defines the cost of an expression as the sum of its elements, where each element has a default cost of 1, subject to the following adjustments.

Class (or "root") elements, as grammatical elements which exist primarily to simplify implementation and perform no particular purpose for the user, count for zero complexity. For example, Catalog.products[.GT(.manufacturer.sales, '1000000')] contains three class elements (the first one, Catalog, and two implicit ones corresponding to Products, preceding the .GT( ) operator and the manufacturer field in the subexpression). None of these class elements add to the complexity of the entire expression. Selectors and functions have a cost defined as the sum of the costs of their subexpressions (in other words, they do not count for any complexity on their own).

Regarding the Problem Description step S112 in FIG. 11, the space of possible grammatically correct synthetic variables is exponential in expression complexity, where the base of this exponent is approximately the average number of fields, selectors, and functions that might be applied at any given point. The vast majority of syntactically valid synthvars are uninteresting. The present invention identifies two classes of filters that are useful for eliminating uninteresting synthetic variables, syntactic filters and data-dependent filters.

One type of syntactic filter is referred to as field loop suppression. Traversal of a one-to-many field followed by its many-to-one inverse is generally not useful. Specifically, if a given field y on table X is one-to-many to Y and an field x from Y to X defined as the inverse of y exists, expressions including X.y.x produce the same data (up to number of copies of each datum instance) as X. For example, while Product.manufacturer.products makes sense (return all products produced by the same manufacturer), Product.manufacturer.products.manufacturer returns the same manufacturers as Product.manufacturer, the former merely outputting multiple copies of each manufacturer. Therefore, we consider the former to be undesirable and suppress its generation.

Loops of this nature may span subexpression boundaries. For example, Catalog.products.manufacturer.products[.GT (.manufacturer.sales, '1000000')] is equivalent, up to repetition, to Catalog.products.manufacturer[.GT(.sales, '1000000')].products and therefore the first form is disallowed.

Another type of syntactic filter is referred to as Repeated fields. In addition to eliminating field loops as described above, there may be instances when the modeler wishes to reduce long chains of repeats of a transitive field. For example, if Click.prev refers to the previous click, the system might try to generate extensions of Click.prev.prev. prev.prev.prev . . . }. If the modeler/operator of the present invention believes that the specifics of only the preceding 3 clicks are relevant, then the system can be limited to 3 repetitions of the prev field.

One type of syntactic filter is referred to as Overriding field complexity. It may sometimes happen that the modeler wishes to include certain fields more often or less often than average. The present invention allows the modeler to override the default cost of 1 on a per-field basis, to any positive value.

One simple example which arises frequently in relational data is in response to the typical relational modeling technique of introducing a table solely to model a many-to-many relation. For example, if the schema includes Orders and Products tables and an OrdersToProducts table which relates the two (and has no other fields), then you may wish to set the cost of traversing the fields in the ordersToProducts table to zero so that you may navigate from Orders to Products or vice versa for a fixed cost of one (e.g., Orders.ordersToProducts.product—ordersToProducts.product should count as 1, not 2, field traversals, since it is introduced only because many databases don't support set-valued fields well).

This rule allows for modification of the search space in two directions. First, when the overridden complexity for field x is less than 1.0, it allows x to be expanded more than other fields. This actually increases the search space for a given expression complexity, but it may cause desired variables to appear in searches at lesser expression complexities. Second, if the overridden complexity is greater than 1.0, it will reduce the search space at a given expression complexity by eliminating certain variables from it.

Another of syntactic filter is referred to as Exclusion of fields from top-level paths. In some of our models, data are related both spatially and temporally, and in these cases we often want to only create synthetic variables which join on both spatial and temporal relations. However, the grammar does not provide a dedicated mechanism for multi-column joins (see future work discussion of multi-column joins) and we instead use a field traversal in combination with a selector.

Because we use this technique for implementing multi-column joins, one way to reduce the number of variables, is to allow the modeler to specify that certain fields can only be used within selectors. Although this may be a suboptimal solution, it has worked quite well in practice. Addressing this issue more cleanly (along with the issue of specifying model dimensions such as time and space) is on our list of future research topics.

One type of syntactic filter is referred to as Binary operators argument match. Arguments to a binary operator such as Equals( ) or .GT( ) must be of the same type. However, primitive types may represent many semantic types. The present invention may generate many meaningless combinations. For example, product weight and manufacturer annual sales may both be numeric, but it probably does not make sense to compare the two. Thus, for primitive types, it is required that comparisons are formed only if the values are coming from the same field on the same table. This however does not mean that the present invention will miss possibly interesting comparisons. The modeler can manually create variables containing such comparisons when desired. Integration with a richer domain type model would improve the ability to match types in comparators.

Aggregator selection is a final type of syntactic filter. It is very easy for the search routine of the present invention to create huge numbers of variables merely by appending aggregators on the end of expressions. Most often, the operator only wants to see one or two aggregators. Therefore, it is required that the modeler specifically enable aggregators on a per-field basis.

Regarding data-driven filtering, there are many grammatically valid variables which are constant-valued. The variable may aggregate large amounts of missing or constant data, or may be provably axiomatic. For example, Click.session. clicks [.GT(.prev.time, time)].Count( ) will, presuming clicks are properly ordered in time, always be zero (no clicks temporally precede their relationally preceding click). While such variables may (occasionally) reveal something interesting about the domain or the data, they cannot have a use in a probabilistic relational model, and are generally uninteresting. Since there are so many such uninteresting variables, by default, we exclude them. This filtering rule can only be applied if we have data with which to empirically determine the multi-valuedness of the variable.

For long expressions with a high field branching factor, evaluation can be expensive. Consider Product.manufacturer.products.orders.purchaser.orders.total.Mean( ), which is the average total bill on all orders put in by customers who bought products from the same manufacturer as the product in question. Evaluating that variable may take some time, depending on the amount of data present. Later on, when actually evaluating the model, this is not a problem as the present invention can evaluate the variable once for each underlying instance and cache that final value. However, during synthetic variable search, when creating a large number of candidate variables and evaluating them to determine if they have a trivial domain, the present invention estimates variables more quickly.

Therefore, we introduce a sampling-based synthetic variable estimation technique that limits the exponential branching problem at the cost of a slight risk of falsely marking variables as having a trivial domain. When in estimation mode, each field in an expression has a soft-limit s (default value 100) on the cardinality of its output data set. The output data, as they are generated, are split into buckets of size s/2, and each datum from bucket i, beginning at i=1, is output with probability $2^{-i}$. Although the data are not sampled fairly (this would be impossible without knowing in advance how much data we have), this approach is sufficient for the issue at hand: predicting whether or not the synthetic variable outputs more than one value.

Regarding the Human-machine Interactive Search Process step S113, the modeling will be an iterative process, involving repeated searches and synthetic variable defining phases, adding and removing variables from the models, interspersed with model structure discovery and analysis of results. Even with the above heuristics and filtering rules, many created variables are uninteresting. Also, there are many variables a modeler might wish to create which occur at expression complexities (or areas of the search space) beyond those we explore. Even if it were computationally feasible to explore these areas of the space, there are many times when the modeler wishes to create specific variables or specific types of variables, without creating all other variables that occur at that expression complexity. In short, despite the elimination of large sets of definitely irrelevant variables, there is still a need for an interactive human-machine synthetic variable identification process.

Figure 12:
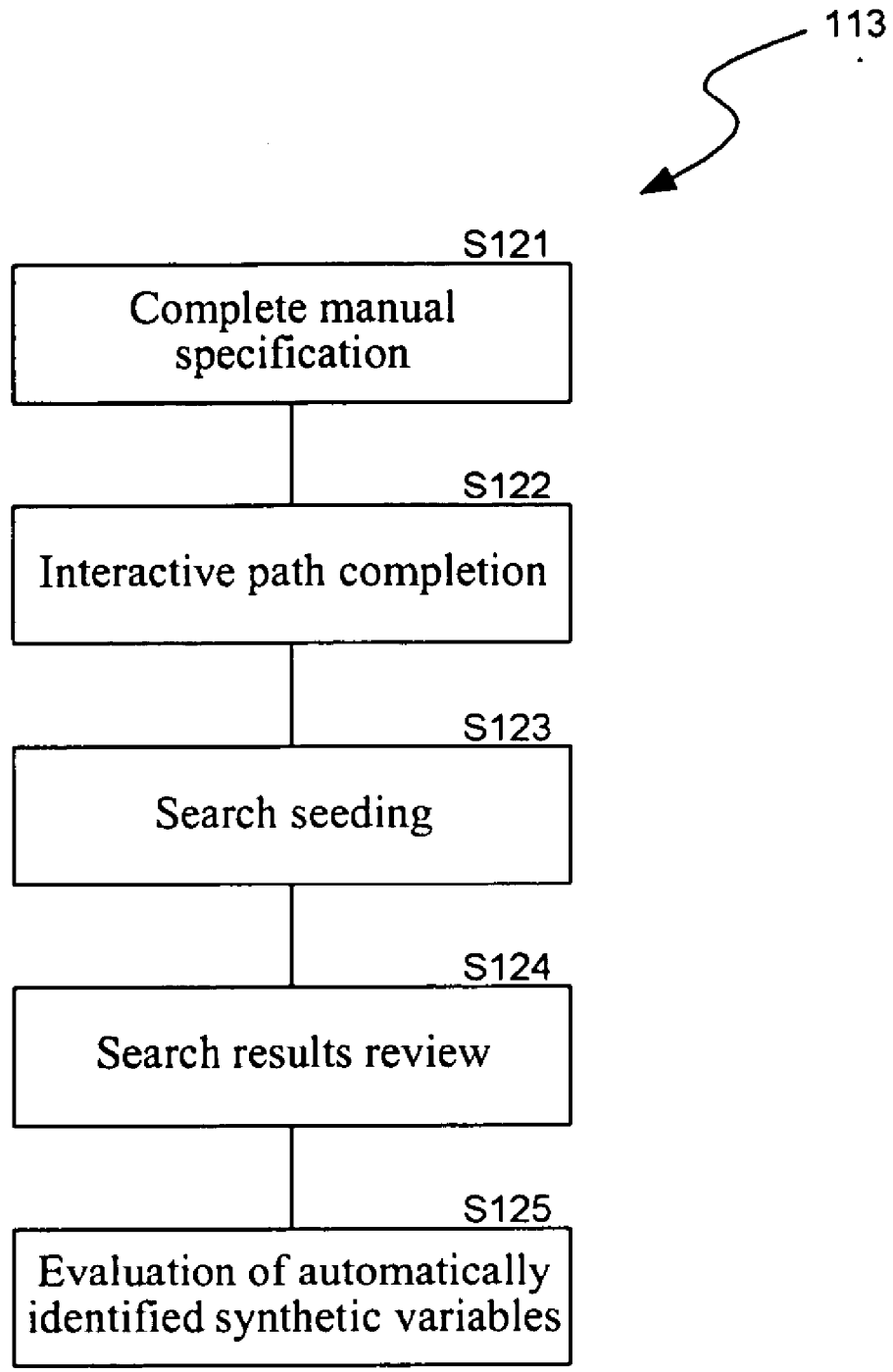
FIG. 12 illustrates the interactive processing steps of the discovery method of the present invention.

FIG. 12 shows more details of the Human-machine Interactive Search Process step S113. The first step in this process is Considering the Complete manual specification, step S121. The invention provides a parser that allows the modeler to input free-form synthetic variable definitions and add them to the results list. The parser is by far the most powerful way to create synthetic variables, as any grammatically and type-correct synthetic variable may be created. A number of interesting variables in a few domains which can only be created with the parser. These include variables that have a constant value as one operand of an operator, for example Click.session.clicks[.GT('10', . click_id)].page_type_Mode( ). Parsed variables may be added to the search results list, examined, and added to the model.

Interactive path completion is step S122. The present invention provides a simple mechanism for guiding the search process using a form of automatic path completion. The modeler may choose a root class, and then iteratively build a synthetic variable by selecting subsequent elements from a list of possibilities. This tool uses the same algorithm as the general search, so it will produce only elements that would be found by a standard search; however, because of the manual control of the search, it allows the modeler to "drill down" to greater expression complexity than is feasible to search automatically. Variables created in this manner may also be added to the search results list, examined, and added to the model.

Search seeding is step S123. Partially completed variables, generated through either of the above two mechanisms, can be used to initialized the queue for an automated search. For example, initializing the queue with Click.session.clicks[.GT('10', .click_id)] will result in exploring the space of synthetic variables about the first ten clicks in a session.

Search results review is element 124. Instead of automatically including all search results in the subsequent structure discovery phase, we allow the user to perform an explicit search and peruse the results. Each synthetic variable in the results list may be evaluated on the loaded instance data, to produce either raw data or histograms, and can be deleted from the search results list or added to the model (for inclusion in later structure discovery). The results list may also be sorted by their definition, which allows the modeler to easily delete large classes of variables known to be uninteresting.

Evaluation of automated identification of synthetic variables is step S125 in FIG. 12. The search procedure can be viewed in terms of recall (proportion of variables we wanted to see which were actually returned) and precision (proportion of variables returned which are actually interesting).

Figure 13:
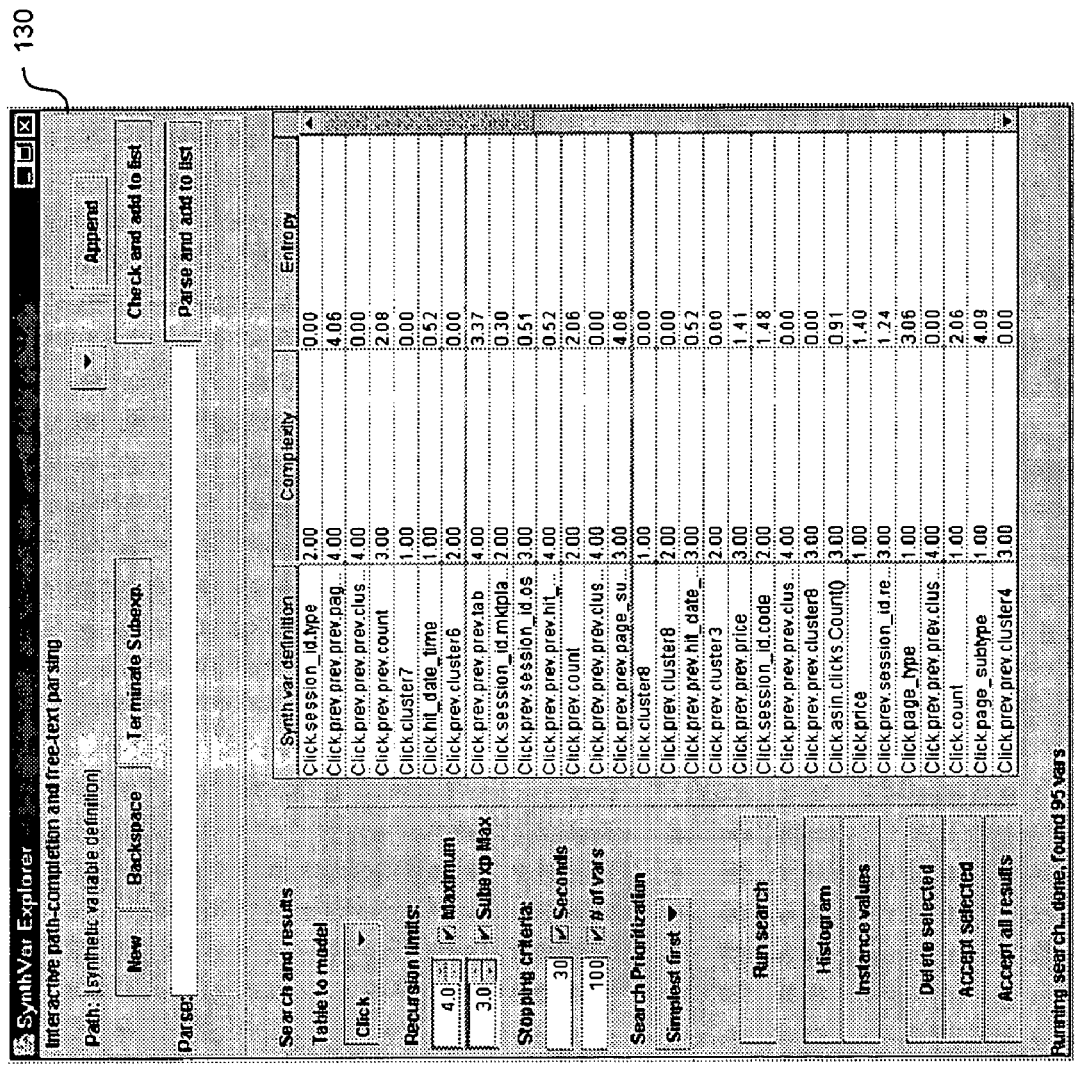
FIG. 13 illustrates a screen shot of synthetic variables generated in the discovery method of the present invention.
Figure 14:
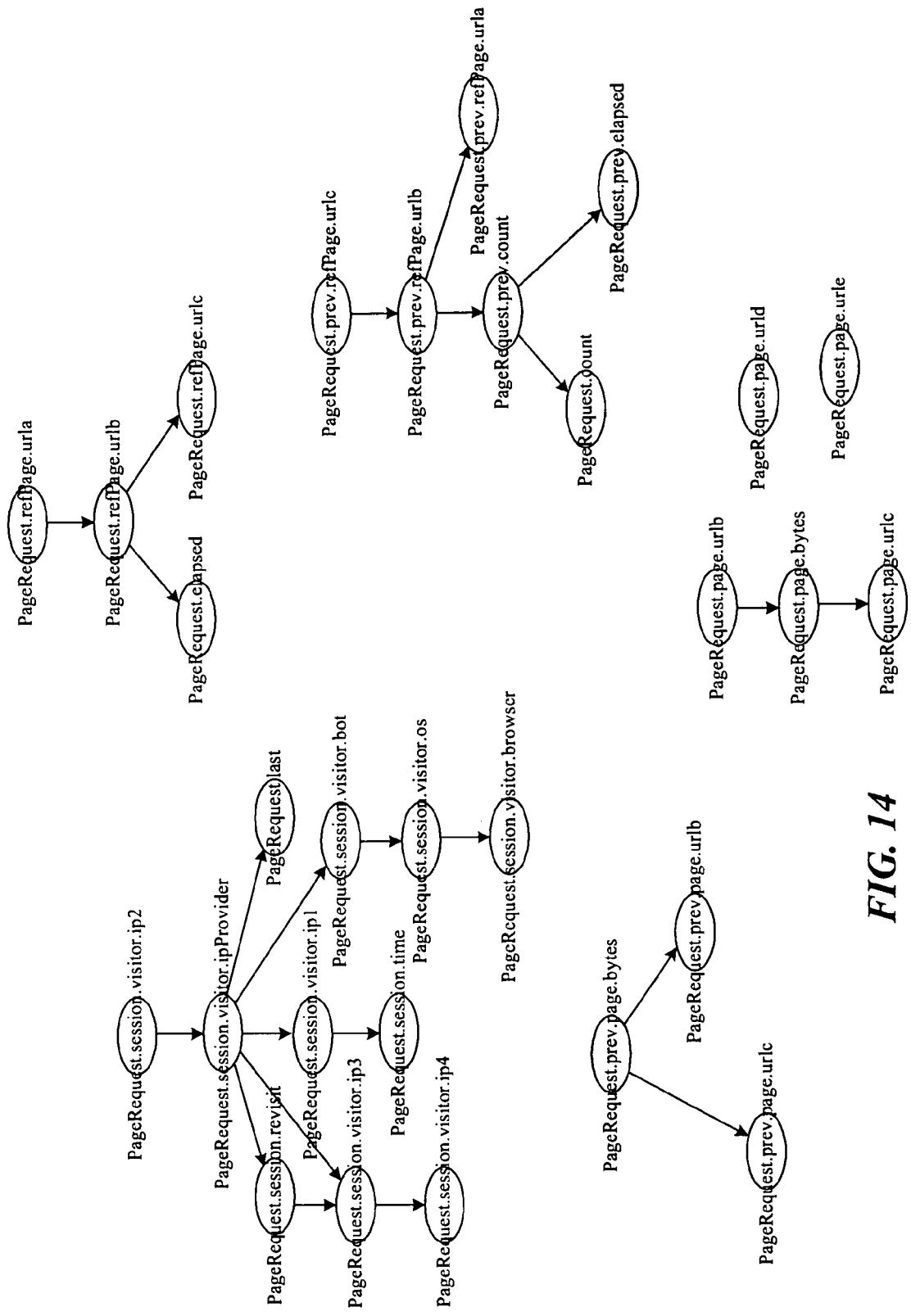
FIG. 14 illustrates a relational Bayesian model produced by the present invention.

FIG. 13 shows a screen shot 130 of the synthetic variables generated using the methods of the present invention as described above. As described with reference to FIG. 5, the operator interacts with the system through a display. The programs of the present invention allow for operator inputs and criteria that may effect the creation of the Bayesian network model. Displaying the variables to the operator allows the key synthetic variables to be determined and used in model creation as set forth in FIG. 12. For example, at expression complexity of 9 in the web-behavior schema, the present invention generates about 80 synthetic variables, including all the variables we had previously determined as essential to the model.

Roughly 25% of the variables found appear to be meaningful and potentially useful. This search is tractable: depending on search settings it takes between 30 seconds and several minutes on our desktop workstation (1.7 GHz Intel P4). At search complexity 9 all the variables previously determined as essential to the web-behavior model. The search completes in 30 secs-2 minutes, depending on settings, and 25% of the generated variables are meaningful and useful.

In an example the present invention may vary certain subsets of the parameters to attempt to determine the basic way in which those parameters affect the search space, and suggest several future possible experiments. One schema used was a weblog click-stream schema from an online retailer. In the table below the database tables, the number of instances (rows) in each, the numbers of each type of column, and the total number of aggregators enabled on various columns therein. Multivalued reference columns (headed with "*-val" in the table below) are constructed at load time by the storage subsystem.

TABLE 1

ClickStream Schema

| Table | # rows | # columns | 1-val ref cols | *-val ref cols | aggregators |
|---|---|---|---|---|---|
| PageRequest | 3789 | 7 | 4 | 0 | 0 |
| Page | 4823 | 8 | 0 | 0 | 0 |

TABLE 1-continued

ClickStream Schema

| Table | # rows | # columns | 1-val ref cols | *-val ref cols | aggregators |
|---|---|---|---|---|---|
| Session | 802 | 4 | 1 | 1 | 1 |
| Visitor | 563 | 8 | 0 | 0 | 0 |

The present invention fixed the schema, data, aggregator selection, and subexpression complexity limit. Given the fixed parameters, the method begins by searching with no filtering heuristics, then enables them, one by one, in the order listed earlier, and measure for each expression complexity limit: (1) the elapsed time, and (2) the number of variables generated.

In order to implement a Goal-based Search 114 the present invention provides a simple heuristic search framework for synthetic variables, and evaluated three heuristics: (1) lowest syntactic complexity first; (2) highest entropy first; (3) highest log probability of native variables given synthvar first. The heuristics can be ordered by the comprehensiveness of the data included in the heuristic (simplest to most comprehensive):

In the simplest case of no data filtering, the ordering is based on examining the data on the variable itself (Entropy). The basic intuition behind the entropy-based heuristic is that it is an extension of our data-based filtering: variables that yield a singleton domain, obviously useless in modeling, are just the extreme end-point in entropy, so perhaps low entropy variables in general are less useful than higher entropy variables. The present invention also contemplates ordering based on examining the marginal impact of a synthvar on the model (LogProb) and ordering based on examining the joint impact of a set of variables on the model.

In order to Evaluate the Goal-based Search 114, partially expanded queue elements were scored by a weighted sum of completed synthvar scores, where the weights were computed via a simple similarity metric. The present invention evaluated the click-stream dataset reported above, using a synthvar complexity limit of 8, a subexpression complexity limit of 3, and a synthvar count target of 50 (i.e., generating the first 50 synthvars from each heuristic). Finally, the present invention scored the result by performing structure discovery over the resulting variable sets, and then scoring the resulting models on log probability of the data given the model. Scores are shown below.

TABLE 2

Search Heuristic Performance

| Heuristic | Log Probability of data |
|---|---|
| None (data marginals) | −9104 |
| Simplest first | −4673 |
| Entropy | −2231 |
| Log Prob Data | −2168 |

The results of the present invention show a simple entropy-based heuristic method performs well.

Figure 15:
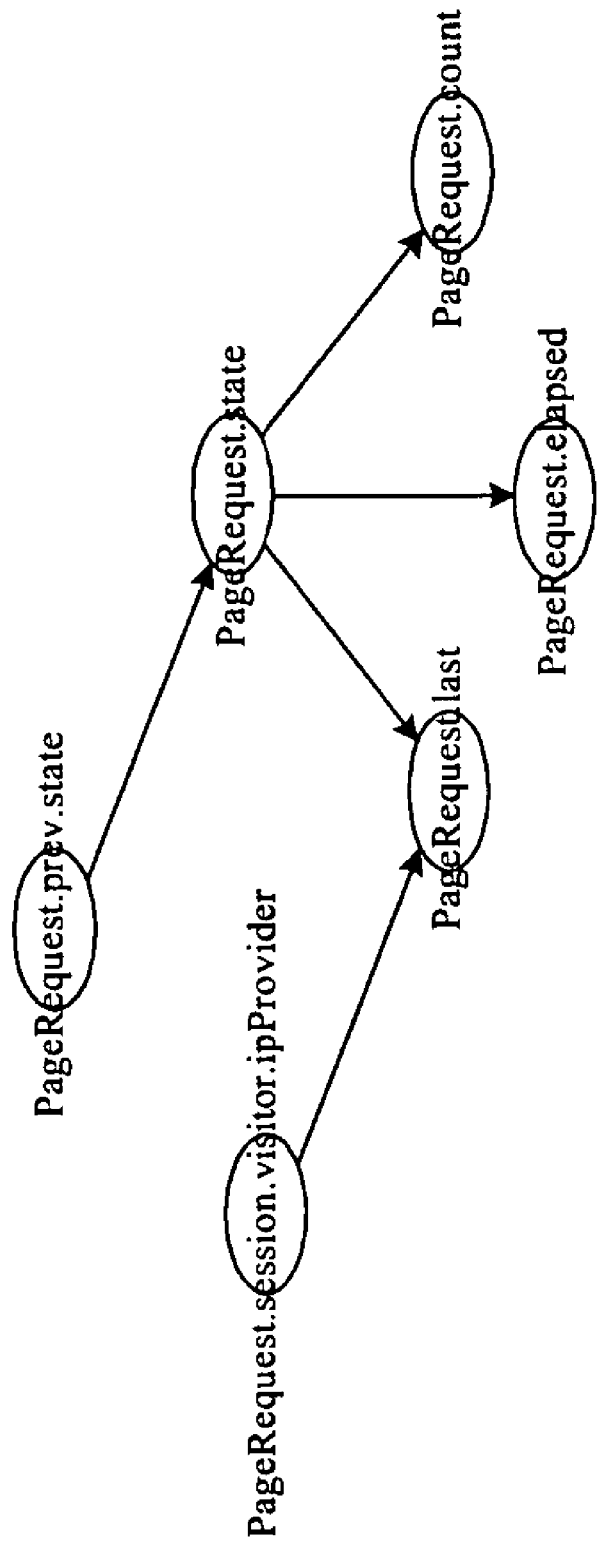
FIG. 15 illustrates a relational Bayesian model produced by the present invention.

The dynamic relational Bayesian model in FIG. 15 includes several hidden variables, each of which is in a "Naïve Bayes" relationship to observables in its scope. There is one a hidden variable each at the Visitor and Session levels, and three at the PageRequest, or Click, level. The three at the click-level model hidden state for the overall PageRequest, for the page being requested, and for the referring page. All PageRequest-level hidden variables are modeled as state elements of a Markov processes, that is, each is dependent on its state for the previous request.

Figure 16:
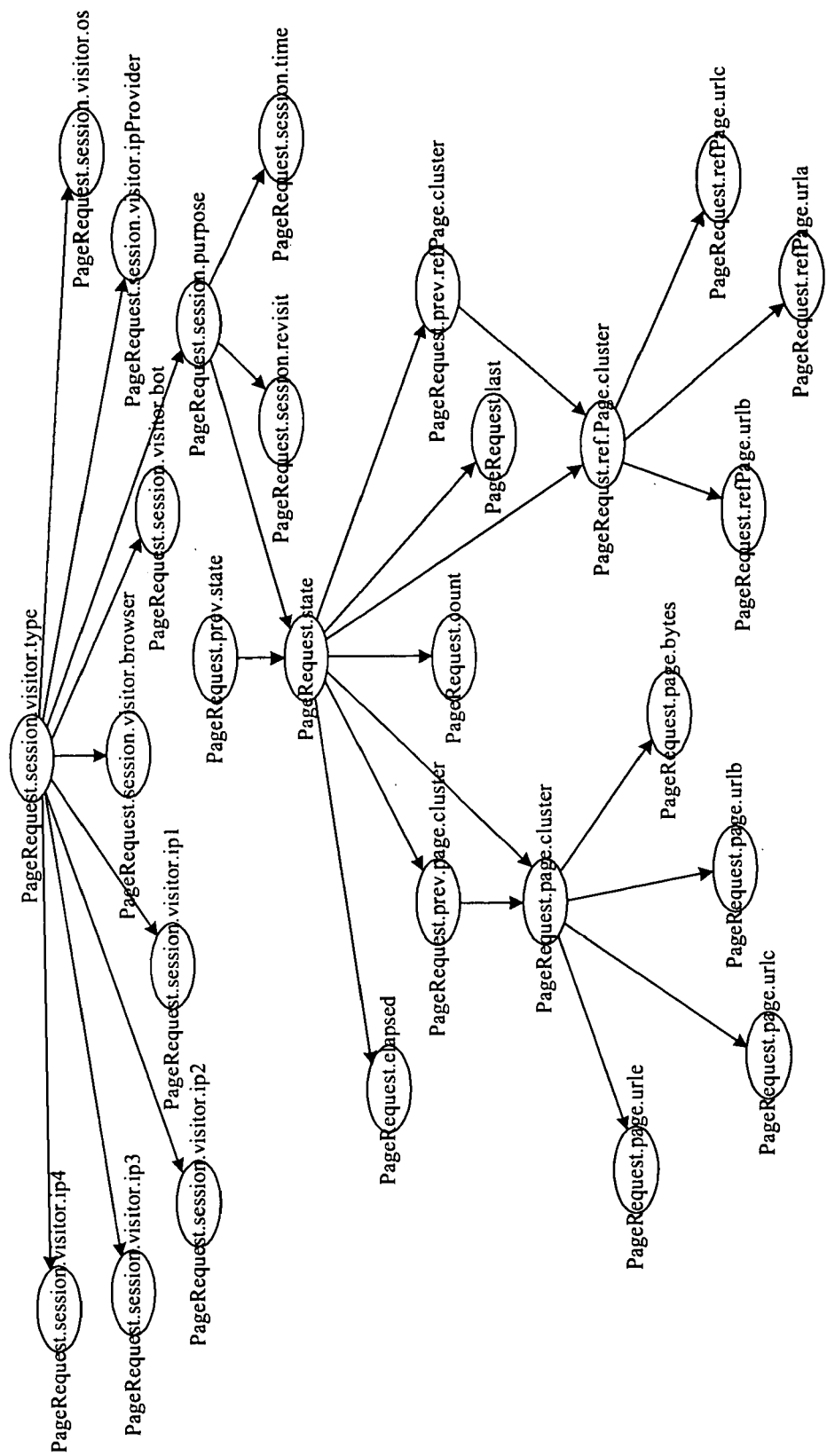
FIG. 16 illustrates a relational Bayesian model produced by the present invention.
Figure 17:
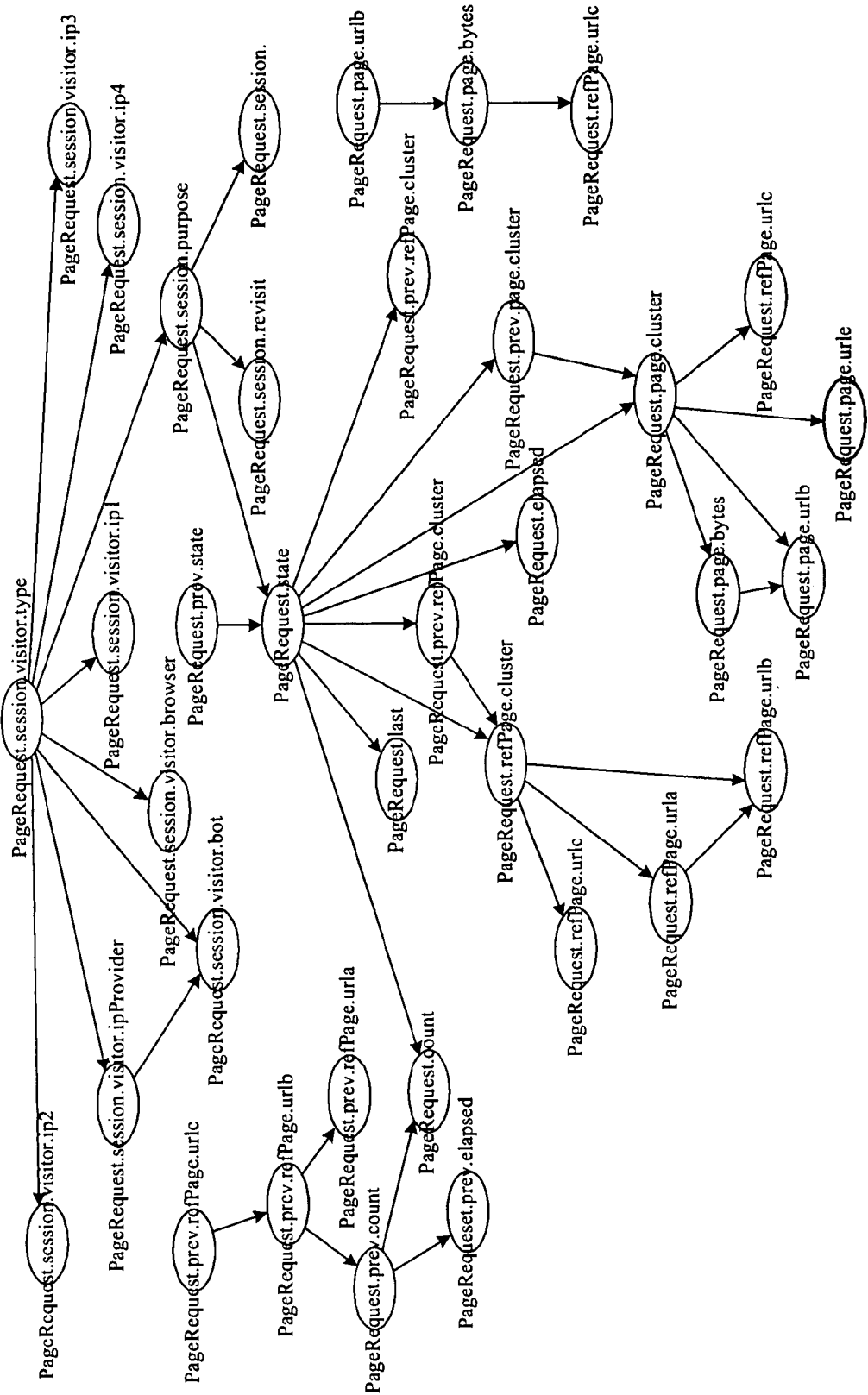
FIG. 17 illustrates a relational Bayesian model produced by the present invention.

We perform parameter estimation on such models using efficient variants of EM. The methods result in computation patterns that reproduce the efficiency of Baum-Welch, for example, on single-level structures, and extended versions of Baum-Welch [Baum, 1970] for more general nested models such as Visitor-Session-Click. Three separate dimensions of dynamics are clustered at the click level: overall state, viewed page, and referring page. The viewed page and referring page clusters categorize URL based on a combination of both the static page features (keywords appearing in the URLs) and the dynamics of page use (note the links from prev.refPage.cluster to refpage.cluster and from prev. page.cluster to page.cluster), modeling both as sub-hidden Markov models within the overall PageRequest model. Reasonable convergence of the parameter estimation algorithm is achieved after a small number of iterations. The model in FIG. 15 achieves an AUC of 0.71 for last-click prediction on the same dataset as above. A more general model that includes additional links modeling dependencies among page attributes (FIG. 16) scores even higher, achieving an AUC of 0.78.

A major advantage of this method is that it does not require a separate process for page-type categorization. Rather, pages are categorized "in-vivo" incorporating both static descriptive information (in this case, URL keywords) and dynamic link usage information. This indicates significant performance improvement when compared with simpler models.

The implementation already caches top-level synthetic variable results for each instance. As discussed earlier two identified opportunities for caching subexpression results: (1) when a subexpression is evaluated multiple times during a single top-level evaluation and its result depends only on the top-level instance being evaluated; (2) when a subexpression appears in multiple synthetic variables.

The present invention's synthetic variable implementation is layered on the memory-resident storage system as shown in FIG. 5. The storage system can load data from a database at startup through JDBC, but this should be extended to eliminate the requirement that all data be memory resident during model discovery. The primary reason for this is the existence of data that we may not want to include directly in a model, but may need to refer to in synthetic variables.

Using the relational Bayesian models as described above, the present system as shown in FIG. 5 may model and predict a user's web-behavior, and specifically determine when a user's last click on a website may be. Once a "last click" has been determined the system may further enact additional web-events.

Figure 18:
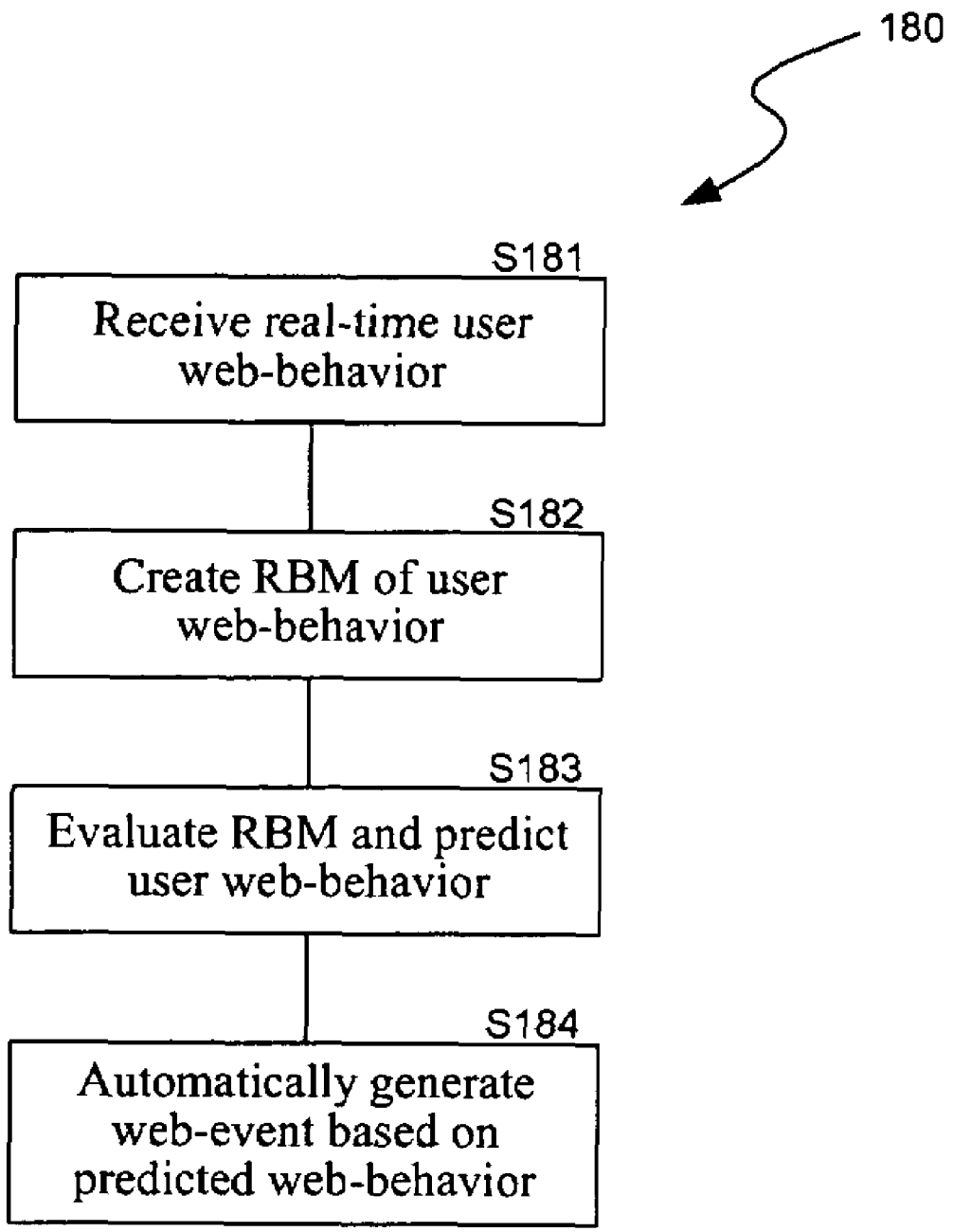
FIG. 18 illustrates the processing steps of a method of the present invention.

FIG. 18 shows a flow diagram of method steps 180 enacted by the system regarding modeling and predicting real-time user web-behavior. The process begins in step S181 as the real-time data and information is received regarding the user's behavior. In step S182 the system creates the relational Bayesian model with which to predict the user's web-behavior. In step S183 the model is evaluated to predict some type of behavior using the methods described above. In step S184 the system automatically generates a web-event based on the predicted user behavior. In an e-commerce environment for example, if the system predicts and determines a "last click" will occur, an interactive web-process may automatically be displayed on the screen in order to keep the user logged on to a business website. Other forms of web-events such as advertisements may be automatically produced by the system in step S184.

One skilled in the art will appreciate that although specific embodiments of the relational Bayesian language, methods and system have been described for purposes of illustration, various modifications can be made without deviating from the spirit and scope of the present invention. For example, the present invention may be applied to many different types of relational modeling systems that may receive and model many different types of data or information or web-behaviors. Accordingly, the invention is described by the appended claims.

I claim:

1. A method for automatically generating a relational Bayesian network to model and predict user web-behavior events in an e-commerce environment using synthetic variables, comprising the acts of:
   providing a language to represent and create a plurality of synthetic variables;
   providing an inference using the plurality of synthetic variables;
   providing a discovery of the plurality of synthetic variables; and
   wherein:
   each synthetic variable in the plurality of synthetic variables comprises an expression comprising a chain of one or more elements mapping input data to output data,
   wherein:
   each of the one or more elements is selected from the group consisting of fields, selectors, functions, variables, and constants;
   a first element in the chain of one or more elements is a root element that is a name of a database table in a schema;
   each element in the chain of elements following the first element accepts output data from a previous element and produces input data for a subsequent element;
   a value of the expression is an output of a last element in the chain:
   such input data to a field element in a synthetic variable includes a table on which the field is defined, such as user sessions or user mouse clicks;
   such input data to a selector element in a synthetic variable includes the values of fields in a database table or output of other elements of the synthetic variable;
   such input data to a function element of a synthetic variable includes the values of fields in a database table, output of other elements of the synthetic variable, or a subexpression of the synthetic variable;
   such output data of each field element in a synthetic variable includes data containing the reference or primitive values contained in an appropriate field on the incoming data;
   such output data of each selector element in a synthetic variable includes a subset of input data to the selector element for which an associated boolean expression evaluates to true;
   such output data of each function element in a synthetic variable is a value based on arguments to the function; and
   such input data, such output data, and such synthetic variables are stored in a computer-readable medium.

2. The method for automatically generating a Bayesian network to model and predict user web-behavior events in an e-commerce environment as in claim 1 wherein a representation of the language includes identifying selection phrases.

3. The method for automatically generating a Bayesian network to model and predict user web-behavior events in an e-commerce environment as in claim 2 wherein a representation of the language includes a selection phrase grammar.

4. The method for automatically generating a Bayesian network to model and predict user web-behavior events in an e-commerce environment as in claim 3 wherein a representation of the language includes identifying aggregation operators.

5. The method for automatically generating a Bayesian network to model and predict user web-behavior events in an e-commerce environment as in claim 4 wherein providing an inference of a synthetic variable includes evaluating a field element.

6. The method for automatically generating a Bayseian network to model and predict user web-behavior events in an e-commerce environment as in claim 5 wherein providing an inference of a synthetic variable includes evaluating a selector.

7. The method for automatically generating a Bayesian network to model and predict user web-behavior events in an e-commerce environment as in claim 6 wherein providing an inference of a synthetic variable includes evaluating a function.

8. The method for automatically generating a Bayesian network to model and predict user web-behavior events in an e-commerce environment as in claim 7 wherein providing an inference of a synthetic variable includes evaluating a variable.

9. The method for automatically generating a Bayesian network to model and predict user web-behavior events in an e-commerce environment as in claim 8 wherein predicting an event based on a combination of the plurality of synthetic variables is achieved using a Bayesian network model.

10. The method for automatically generating a Bayesian network to model and predict user web-behavior events in an e-commerce environment as in claim 9 wherein providing a discovery of the plurality of synthetic variables includes using syntactic filters.

11. The method for automatically generating a Bayesian network to model and predict user web-behavior events in an e-commerce environment as in claim 10 wherein providing a discovery of the plurality of synthetic variables includes data driven filtering.

12. The method for automatically generating a Bayesian network to model and predict user web-behavior events in an e-commerce environment as in claim 1 wherein providing a discovery of the plurality of synthetic variables includes a user interactive process.

13. The method for automatically generating a Bayesian network to model and predict user web-behavior events in an e-commerce environment as in claim 12 wherein providing a discovery of the plurality of synthetic variables includes displaying synthetic variables to the user.

14. The method for automatically generating a Bayesian network to model and predict user web-behavior events in an e-commerce environment as in claim 13 wherein providing a discovery of the plurality of synthetic variables includes displaying a complexity of the synthetic variables to the user.

15. The method for automatically generating a Bayesian network to model and predict user web-behavior events in an e-commerce environment as in claim 14 wherein providing a discovery of the plurality of synthetic variables includes goal based searching.

16. A method for searching a database to automatically generate a relational Bayesian network model using synthetic variables comprising:
  providing a database of information;
  providing a relational Bayesian network model with the information;
  providing a language to create from the relational Bayesian network model a plurality of synthetic variables;
  providing an inference using the plurality of synthetic variables;
  providing a discovery of the plurality of synthetic variables
  wherein:
  each synthetic variable in the plurality of synthetic variables comprises an expression comprising a chain of one or more elements mapping input data to output data,
  wherein:
  each of the one or more elements is selected from the group consisting of fields, selectors, functions, variables, and constants;
  a first element in the chain of one or more elements is a root element that is a name of a database table in a schema;
  each element in the chain of elements following the first element accepts output data from a previous element and produces input data for a subsequent element;
  a value of the expression is an output of a last element in the chain; and
  such input data, such output data, and such synthetic variables are stored in a computer-readable medium.

17. The method for search a database to automatically generate a relational Bayesian network model as in claim 16 wherein the discovery of the plurality of synthetic variables includes displaying the synthetic variables.

18. The method for searching a database to automatically generate a relational Bayesian network model as in claim 17 wherein the discovery of the plurality of synthetic variables includes allowing a user to select the synthetic variables used to create the Bayesian network model.

19. The method for searching a database to automatically generate a relational Bayesian network model as in claim 16 wherein the discovery of the plurality of synthetic variables allows a user to create a synthetic variable.

20. The method for searching a database to automatically generate a relational Bayesian network model as in claim 16 wherein the database of information relates to statistics in an e-commerce environment.

21. A system for automatically generating a relational Bayesian network model using synthetic variables comprising:
  a database of information;
  a language to create from the database of information a plurality of synthetic variables;
  a processor that provides an inference using the plurality of synthetic variables, wherein the processor further provides a discovery of the plurality of synthetic variables and creates a relational Bayesian network model; and
  wherein:
  each synthetic variable in the plurality of synthetic variables comprises an expression comprising a chain of one or more elements mapping input data to output data,
  wherein:
  each of the one or more elements is selected from the group comprising fields, selectors, functions, variables, and constants;
  a first element in the chain of one or more elements is a root element that is a name of a database table in a schema;
  each element in the chain of elements following the first element accepts output data from a previous element and produces input data for a subsequent element;
  a value of the expression is an output of a last element in the chain; and
  such input data, such output data, and such synthetic variables are stored in a computer-readable medium.

22. The system for automatically generating a relational Bayesian network model as in claim 21 further comprising a memory for storing application programs containing the language used to create the synthetic variables.

23. The system for automatically generating a relational Bayesian network model as in claim 22 further comprising a display for displaying to an operator the synthetic variables.

24. The system for automatically generating a relational Bayesian network model as in claim 23 wherein the database of information relates to an e-commerce environment.

25. The system for automatically generating a relational Bayesian network model as in claim 24 wherein an event predicted is a user's last click in an e-commerce environment.

26. A method for creating a relational Bayesian network to model and predict a user's real-time behavior in an e-commerce environment comprising the acts of:
  receiving real-time information regarding a user's first real-time web-behavior;
  wherein the real-time information is stored in a computer-readable medium;
  constructing a relational Bayesian network to model and predict a user's second real-time web-behavior,
  wherein the relational Bayesian network is stored in a computer-readable medium; and
  modeling the user's second real-time web-behavior by evaluating the Bayesian network,
  wherein the resulting model is stored in a computer-readable medium.

27. The method for crating a relational Bayesian network to model and predict a user's web-behavior as in claim 26 wherein modeling the user's second real-time web-behavior includes predicting a probability that the user's next click will be the last click.

28. The method for creating a relational Bayesian network to model and predict a user's web-behavior as in claim 27 wherein modeling the user's second real-time web-behavior includes evaluating a plurality of synthetic variables and
  wherein:
  each synthetic variable in the plurality of synthetic variables comprises an expression comprising a chain of one or more elements mapping input data to output data,
  wherein:
  each of the one or more elements is selected from the group consisting of fields, selectors, functions, variables, and constants;
  a first element in the chain of one or more elements is a root element that is a name of a database table in a schema;

each element in the chain of elements following the first element accepts output data from a previous element and produces input data for a subsequent element;

a value of the expression is an output of a last element in the chain; and such input data, such output data, and such synthetic variables are stored in a computer-readable medium.

29. The method for creating a relational Bayesian network to model and predict a user's web-behavior as in claim 28 wherein a first synthetic variable in the plurality of synthetic variables is "The elapsed time between the current click and the previous click".

30. The method for creating a relational Bayesian network to model and predict a user's web-behavior as in claim 29 wherein a second synthetic variable in the plurality of synthetic variables is "The average elapsed time between clicks in a session".

31. The method for creating a relational Bayesian network to model and predict a user's web-behavior as in claim 30 wherein a third synthetic variable in the plurality of synthetic variables is "The number of clicks in a session".

32. The method for creating a relational Bayesian network to model and predict a user's web-behavior as in claim 31 wherein a fourth synthetic variable in the plurality of synthetic variables is "The number of clicks in a session preceding the current click".

33. The method for creating a relational Bayesian network to model and predict a user's web-behavior as in claim 27 further comprising the act of performing a web-event when it is determined that the user's next click will be the last click.

34. The method for creating a relational Bayesian network to model and predict a user's web-behavior as in claim 33 further wherein the act of performing a web-event comprises providing an advertisement.

35. The method for creating a relational Bayesian network to model and predict a user's web-behavior as in claim 33 further wherein the act of performing a web-event comprises providing a user interactive application.

* * * * *

UNITED STATES PATENT AND TRADEMARK OFFICE
CERTIFICATE OF CORRECTION

| | | |
|---|---|---|
| PATENT NO. | : 7,328,201 B2 | Page 1 of 1 |
| APPLICATION NO. | : 10/888353 | |
| DATED | : February 5, 2008 | |
| INVENTOR(S) | : Bruce Douglass D'Ambrosio | |

It is certified that error appears in the above-identified patent and that said Letters Patent is hereby corrected as shown below:

Column 1, line 15, add second paragraph after Cross-Reference to Related Application as follows:

--GOVERNMENT FUNDING
The invention described herein was made, in whole or in part, with government support under Grant Number DMI-0349497 awarded by the National Science Foundation. The United States Government has certain rights in the invention.--

Signed and Sealed this

Thirteenth Day of May, 2008

JON W. DUDAS
*Director of the United States Patent and Trademark Office*